(12) United States Patent
Duffy et al.

(10) Patent No.: US 11,801,551 B2
(45) Date of Patent: Oct. 31, 2023

(54) METHODS OF FORMING EARTH-BORING TOOLS USING INSERTS AND MOLDS

(71) Applicant: Baker Hughes Holdings LLC, Houston, TX (US)

(72) Inventors: Stephen Duffy, Spring, TX (US); Michael T. Savage, Magnolia, TX (US); James Andy Oxford, Magnolia, TX (US)

(73) Assignee: Baker Hughes Holding LLC, Houston, TX (US)

( * ) Notice: Subject to any disclaimer, the term of this patent is extended or adjusted under 35 U.S.C. 154(b) by 156 days.

(21) Appl. No.: 16/020,519

(22) Filed: Jun. 27, 2018

(65) Prior Publication Data

US 2020/0001367 A1    Jan. 2, 2020

(51) Int. Cl.
*B22D 19/06* (2006.01)
*B22F 5/00* (2006.01)
(Continued)

(52) U.S. Cl.
CPC .............. *B22D 19/06* (2013.01); *B22F 5/00* (2013.01); *B22F 7/06* (2013.01); *B22F 10/00* (2021.01);
(Continued)

(58) Field of Classification Search
CPC ........ B22F 5/00; B22F 7/06; B22F 2005/001; B22F 3/008; B22F 2998/10; B28B 1/001;
(Continued)

(56) References Cited

U.S. PATENT DOCUMENTS

| 7,832,456 B2 | 11/2010 | Calnan et al. |
| 7,832,457 B2 | 11/2010 | Calnan et al. |

(Continued)

FOREIGN PATENT DOCUMENTS

| EP | 1036913 B1 | 10/2002 |
| WO | 2016109074 A1 | 7/2016 |

OTHER PUBLICATIONS

International Search Report for International Application No. PCT/US2019/037352 dated Oct. 11, 2019, 4 pages.
(Continued)

*Primary Examiner* — Rebecca Janssen
(74) *Attorney, Agent, or Firm* — TraskBritt (57) ABSTRACT

In some embodiments, the present disclosure includes a method of forming a body of an earth-boring downhole tool. A mold is formed that has at least one interior surface defining a mold cavity within the mold. The mold cavity has a shape corresponding to a shape of the body of the earth-boring downhole tool to be formed therein. At least one insert is formed that includes particles of hard-phase material and a binder material using an additive manufacturing process. The at least one insert is positioned within the mold cavity. Additional particles of hard-phase material are provided within the mold cavity, and the additional particles of hard-phase material are infiltrated with molten metal, thus sintering and/or infiltrating the at least one insert to form the body of the earth-boring downhole tool. The resulting body of the earth-boring downhole tool includes the sintered and/or infiltrated at least one insert.

19 Claims, 6 Drawing Sheets

(51) Int. Cl.
  *B22F 7/06*    (2006.01)
  *B22F 10/00*   (2021.01)
  *E21B 10/55*   (2006.01)
  *B33Y 10/00*   (2015.01)
  *B28B 1/00*    (2006.01)
  *B33Y 70/00*   (2020.01)
  *B22F 10/14*   (2021.01)

(52) U.S. Cl.
  CPC .............. *B22F 10/14* (2021.01); *B28B 1/001* (2013.01); *B33Y 70/00* (2014.12); *B22F 2005/001* (2013.01); *B33Y 10/00* (2014.12); *E21B 10/55* (2013.01)

(58) Field of Classification Search
  CPC ......... B33Y 70/00; B33Y 10/00; B33Y 70/10; B22D 19/06; E21B 10/55; C22C 1/051; C22C 26/00; C22C 29/08
  See application file for complete search history.

(56) References Cited

U.S. PATENT DOCUMENTS

| | | | |
|---|---|---|---|
| 8,317,893 | B2 | 11/2012 | Stevens et al. |
| 8,945,720 | B2 | 2/2015 | Sreshta et al. |
| 2005/0115743 | A1* | 6/2005 | Griffo ................... B22F 1/025 |
| | | | 175/426 |
| 2007/0277651 | A1* | 12/2007 | Calnan ................... B33Y 80/00 |
| | | | 76/108.4 |
| 2010/0193254 | A1 | 8/2010 | Lind et al. |
| 2012/0005966 | A1* | 1/2012 | Cleboski ............... B24D 99/005 |
| | | | 51/295 |
| 2016/0052108 | A1* | 2/2016 | Miess ................... E21B 10/573 |
| | | | 51/309 |
| 2016/0090824 | A1* | 3/2016 | Overstreet .......... E21B 17/1085 |
| | | | 175/425 |
| 2016/0185009 | A1 | 6/2016 | Keshavan et al. |
| 2017/0050241 | A1* | 2/2017 | Thomas ................ C22C 1/0475 |
| 2019/0106941 | A1* | 4/2019 | Prichard ................. C22C 29/08 |
| 2020/0123858 | A1* | 4/2020 | Zhang ..................... E21B 10/43 |
| 2020/0398343 | A1* | 12/2020 | Voglewede ............... B22F 7/08 |

OTHER PUBLICATIONS

International Written Opinion for International Application No. PCT/US2019/037352 dated Oct. 11, 2019, 6 pages.

International Preliminary Report on Patentability for International Application No. PCT/US2019/037352, dated Jan. 7, 2021, 7 pages.

* cited by examiner

METHODS OF FORMING EARTH-BORING TOOLS USING INSERTS AND MOLDS

FIELD

The present disclosure is related to methods of forming bodies of earth-boring tools, and to earth-boring tools formed by such methods.

BACKGROUND

Wellbores are formed in subterranean formations for various purposes including, for example, extraction of oil and gas from the subterranean formation and extraction of geothermal heat from the subterranean formation. Wellbores may be formed in a subterranean formation using a drill bit, such as an earth-boring rotary drill bit. The drill bit is rotated and advanced into the subterranean formation. As the drill bit rotates, the cutters or abrasive structures thereof cut, crush, shear, and/or abrade away the formation material to form the wellbore. A diameter of the wellbore drilled by the drill bit may be defined by the cutting structures disposed at the largest outer diameter of the drill bit.

The depth of well bores being drilled continues to increase as the number of shallow depth hydrocarbon-bearing earth formations continues to decrease. These increasing well bore depths are pressing conventional drill bits to their limits in terms of performance and durability. Several drill bits are often required to drill a single well bore, and changing a drill bit on a drill string can be both time consuming and expensive.

The drill bit is coupled, either directly or indirectly, to an end of what is referred to in the art as a "drill string," which comprises a series of elongated tubular segments connected end-to-end that extends into the wellbore from the surface of earth above the subterranean formations being drilled. Various tools and components, including the drill bit, may be coupled together at the distal end of the drill string at the bottom of the wellbore being drilled. This assembly of tools and components is referred to in the art as a "bottom hole assembly" (BHA).

The drill bit may be rotated within the wellbore by rotating the drill string from the surface of the formation, or the drill bit may be rotated by coupling the drill bit to a downhole motor, which is also coupled to the drill string and disposed proximate the bottom of the wellbore. The downhole motor may include, for example, a hydraulic Moineau-type motor having a shaft, to which the drill bit is mounted, that may be caused to rotate by pumping fluid (e.g., drilling mud or fluid) from the surface of the formation down through the center of the drill string, through the hydraulic motor, out from nozzles in the drill bit, and back up to the surface of the formation through the annular space between the outer surface of the drill string and the exposed surface of the formation within the wellbore. Fluid flow passageways are typically formed in the bit body of the drill bit to allow communication of drilling fluids from associated surface drilling equipment through a drill string or drill pipe attached to the bit body.

Different types of earth-boring rotary drill bits are known in the art, including fixed-blade bits (which are often referred to in the art as "drag" bits), rolling-cutter bits (which are often referred to in the art as "rock" bits), diamond-impregnated bits, and hybrid bits (which may include, for example, both fixed-blade cutters and rolling cutters). Fixed-blade drill bits or drag bits are often formed with a bit body having cutting elements and wear-resistant inserts disposed at select locations of exterior portions of the bit body.

These wear-resistant inserts, known as "hardfacing," may be applied to the formation-engaging surfaces of rotary drill bits to minimize wear of those surfaces of the drill bits caused by abrasion, thus allowing the bit to last longer before needing to be replaced. For example, abrasion occurs at the formation-engaging surfaces of an earth-boring tool when those surfaces are engaged with and sliding relative to the surfaces of a subterranean formation in the presence of the solid particulate material (e.g., formation cuttings and detritus) carried by conventional drilling fluid. Hardfacing may be applied to the cutting face of a drill bit, onto the blades around the cutting elements, in the junk slots, and onto other exterior surfaces of the drill bit that are likely to engage a formation surface during drilling.

Fixed-blade drill bits generally include a metal shank configured for engagement with a drill string or drill pipe. Various types of steel alloys may be used to form the metal shank. For some applications, the bit body may be formed from a steel alloy. For other applications, the bit body may comprise a ceramic-metal composite material in which hard ceramic particles, such as tungsten carbide particles, are cemented together with a metal matrix material. The metal matrix material forms a continuous metal matrix within the bit body in which the hard particles are embedded. Such bit bodies are formed using a casting process in which the hard particles are provided within a mold cavity in a mold, which is typically formed of graphite, and the metal matrix material is melted and allowed to infiltrate the hard particles within the mold cavity. The metal matrix material is then cooled and solidified within the mold, after which the mold is removed from the newly cast bit body. A steel shank may be partially embedded within the hard particles in the mold cavity prior to the infiltration process, such that the steel shank forms a part of the bit body upon completion of the casting process. The resulting bit body thus includes a particle-matrix composite crown with a steel shank portion, and the steel shank portion may be machined as desired to configure the bit body for attachment to a drill string.

The mold for the for the crown portion of the drill bit may be formed by milling a block of material such as graphite to define a mold cavity with features corresponding with desired exterior features of a resulting particle-matrix composite bit body. The mold cavity may be formed with recesses located and configured to define the blades of the resulting particle-matrix bit body. Other various features of the resulting particle-matrix composite bit body, such as cutting element pockets, and/or internal fluid passageways may also be formed by shaping the mold cavity and/or by positioning various temporary displacement materials within interior portions of the mold cavity. Bit bodies formed in this way are known as "matrix bits."

A matrix bit with hardfacing may be formed by applying various wear-resistant structures and/or materials to interior surfaces of the mold within the mold cavity prior to filling the bulk of the mold cavity with the hard-phase particles and infiltrating the hard-phase particles with the metal matrix material so as to cause the wear-resistant structures and/or materials to be incorporated into the resulting bit body at the outer surfaces thereof upon completion of the casting process. The hardfacing on a matrix bit will often comprise hard-phase particles infiltrated with a matrix material similar to the rest of the matrix bit body. However, in the hardfacing surface, the proportion of hard-phase particles will often be higher and the grain size of the hard-phase particles may be configured to provide increased wear resistance relative to the rest of the bit body. For example, the grain size of the hard-phase particles might be finer/smaller in the hardfacing material. Thus, the hardfacing material will often be harder and less ductile than the rest of the bit body allowing for increased wear resistance of those portions of the bit body configured with hardfacing material.

Currently, the process of applying various wear-resistant structures and/or materials (hardfacing) to interior surfaces of the mold within the mold cavity is done by hand and the hardfacing materials are often in the form of putty composed of a binder material impregnated with hard-phase particles. Adding impregnated putty to the interior surfaces of the mold by hand is labor intensive and prone to physical error. This makes the process time consuming and inconsistent in that the placement of the putty, the shape of the putty and the amount of putty used might vary with each application.

Thus, a need exists for placing hardfacing materials or inserts onto interior surfaces of a matrix bit mold with more accuracy, precision, and repeatability to ensure consistent performance of the hardfacing materials or inserts as they are used in drill bits and other earth engaging equipment.

BRIEF SUMMARY

In some embodiments, the present disclosure includes a method of forming a body of an earth-boring downhole tool. A mold is formed that has at least one interior surface defining a mold cavity within the mold. The mold cavity has a shape corresponding to a shape of the body of the earth-boring downhole tool to be formed therein. At least one insert is formed that includes particles of hard-phase material and a binder material using an additive manufacturing process. The at least one insert is positioned within the mold cavity. Additional particles of hard-phase material are provided within the mold cavity, and the additional particles of hard-phase material are infiltrated with molten metal, thus sintering and/or infiltrating the at least one insert to form the body of the earth-boring downhole tool. The resulting body of the earth-boring downhole tool includes the sintered and/or infiltrated at least one insert.

In additional embodiments, the present disclosure includes earth-boring downhole tools having a body formed by such methods and including at least one insert comprising particles of hard-phase material and formed using an additive manufacturing process.

DETAILED DESCRIPTION

The illustrations presented herein are not actual views of any particular earth-boring downhole tool or component thereof, but are merely idealized representations that are employed to describe example embodiments of the present disclosure. Additionally, elements common between figures may retain the same numerical designation. The following description provides specific details of embodiments of the present disclosure in order to provide a thorough description thereof. However, a person of ordinary skill in the art will understand that the embodiments of the disclosure may be practiced without employing many such specific details. Indeed, the embodiments of the disclosure may be practiced in conjunction with conventional techniques employed in the industry. The drawings accompanying the application are for illustrative purposes only, and are not necessarily drawn to scale. Additionally, elements common between figures may retain the same numerical designation.

As used herein, the terms "comprising," "including," "containing," "characterized by," and grammatical equivalents thereof are inclusive or open-ended terms that do not exclude additional, unrecited elements or method steps, but also include the more restrictive terms "consisting of," "consisting essentially of," and grammatical equivalents thereof.

As used herein, the term "may" with respect to a material, structure, feature or method act indicates that such is contemplated for use in implementation of an embodiment of the disclosure, and such term is used in preference to the more restrictive term "is" so as to avoid any implication that other, compatible materials, structures, features, and methods usable in combination therewith should or must be excluded.

As used herein, the term "configured" refers to a size, shape, material composition, and arrangement of one or more of at least one structure and at least one apparatus facilitating operation of one or more of the structure and the apparatus in a predetermined way.

As used herein, the singular forms following "a," "an," and "the" are intended to include the plural forms as well, unless the context clearly indicates otherwise.

As used herein, the term "and/or" includes any and all combinations of one or more of the associated listed items.

As used herein, spatially relative terms, such as "beneath," "below," "lower," "bottom," "above," "upper," "top," "front," "rear," "left," "right," and the like, may be used for ease of description to describe one element's or feature's relationship to another element(s) or feature(s) as illustrated in the figures. Unless otherwise specified, the spatially relative terms are intended to encompass different orientations of the materials in addition to the orientation depicted in the figures.

As used herein, the term "substantially" in reference to a given parameter, property, or condition means and includes to a degree that one of ordinary skill in the art would understand that the given parameter, property, or condition is met with a degree of variance, such as within acceptable manufacturing tolerances.

As used herein, the term "about" used in reference to a given parameter is inclusive of the stated value and has the meaning dictated by the context (e.g., it includes the degree of error associated with measurement of the given parameter).

As used herein, the term "hard-phase material" means and includes any material having a Knoop hardness value of about 1,000 Kgf/mm$^2$ (9,807 MPa) or more. Hard-phase materials include, for example, tungsten carbide, diamond, cubic boron nitride, boron carbide, etc.

As used herein, the term "earth-boring tool" means and includes any type of bit or tool used for removing formation material during the formation or enlargement of a wellbore and includes, for example, rotary drill bits, percussion bits, core bits, eccentric bits, bi-center bits, reamers, mills, drag bits, roller-cone bits, hybrid bits, and other drilling bits and tools known in the art.

As used herein, the term "sintering" means the densification of a particulate component and involves removal of at least a portion of the pores between the starting particles, accompanied by shrinkage, combined with coalescence and bonding between adjacent particles.

Figure 1:
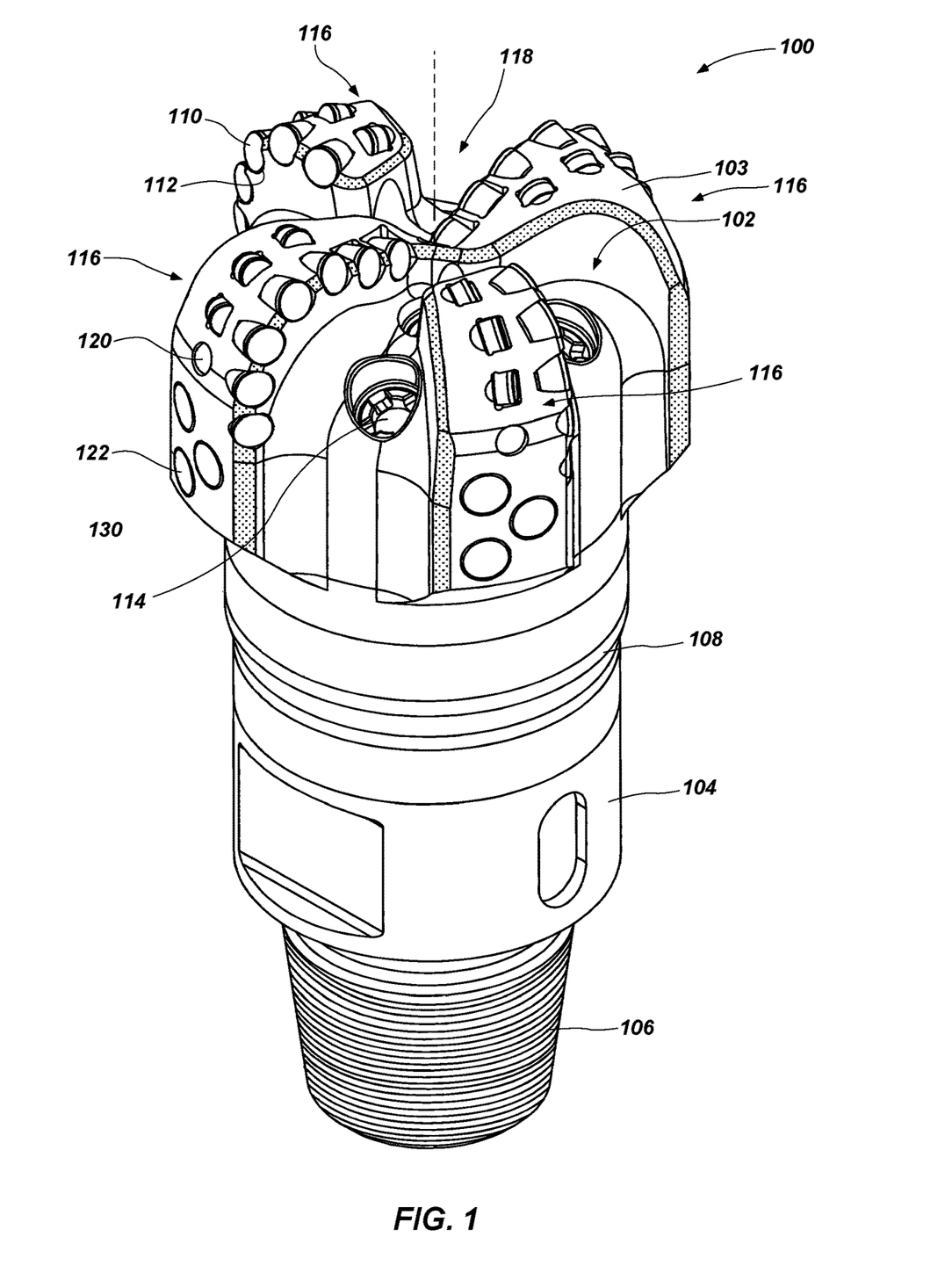
FIG. 1 is a perspective view of an embodiment of an earth-boring downhole tool in the form of a fixed-blade rotary drill bit that may include a bit body including at least one insert comprising particles of hard-phase material and formed using an additive manufacturing process, and which may be formed using embodiments of the methods as described herein.

FIG. 1 is a perspective view of an embodiment of an earth-boring downhole tool that may be fabricated using methods as described herein in further detail below with reference to FIGS. 2-7. The earth-boring downhole tool of FIG. 1 is a fixed-blade earth-boring rotary drill bit 100. The drill bit 100 includes a bit body 102 that may be secured to a shank 104 having a threaded connection portion 106 (e.g., an American Petroleum Institute (API) threaded connection portion) for attaching the drill bit 100 to a drill string. In some embodiments, the bit body 102 may be secured to the shank 104 using an extension 108. In other embodiments, the bit body 102 may be secured directly to the shank 104.

The bit body 102 may include internal fluid passageways that extend between a face 103 of the bit body 102 and an internal longitudinal bore extending through the shank 104, the extension 108, and partially through the bit body 102. Nozzle inserts 114 also may be provided at the face 103 of the bit body 102 within the internal fluid passageways. The bit body 102 may further include a plurality of longitudinally and radially extending blades 116 that are separated by junk slots 118. In some embodiments, the bit body 102 may include gage wear plugs 122 and wear knots 120. A plurality of cutting elements 110 may be mounted onto the face 103 of the bit body 102 in cutting element pockets 112 that are located along each of the blades 116. The cutting elements 110 may include PDC cutting elements, or may include other cutting elements.

Figure 2:
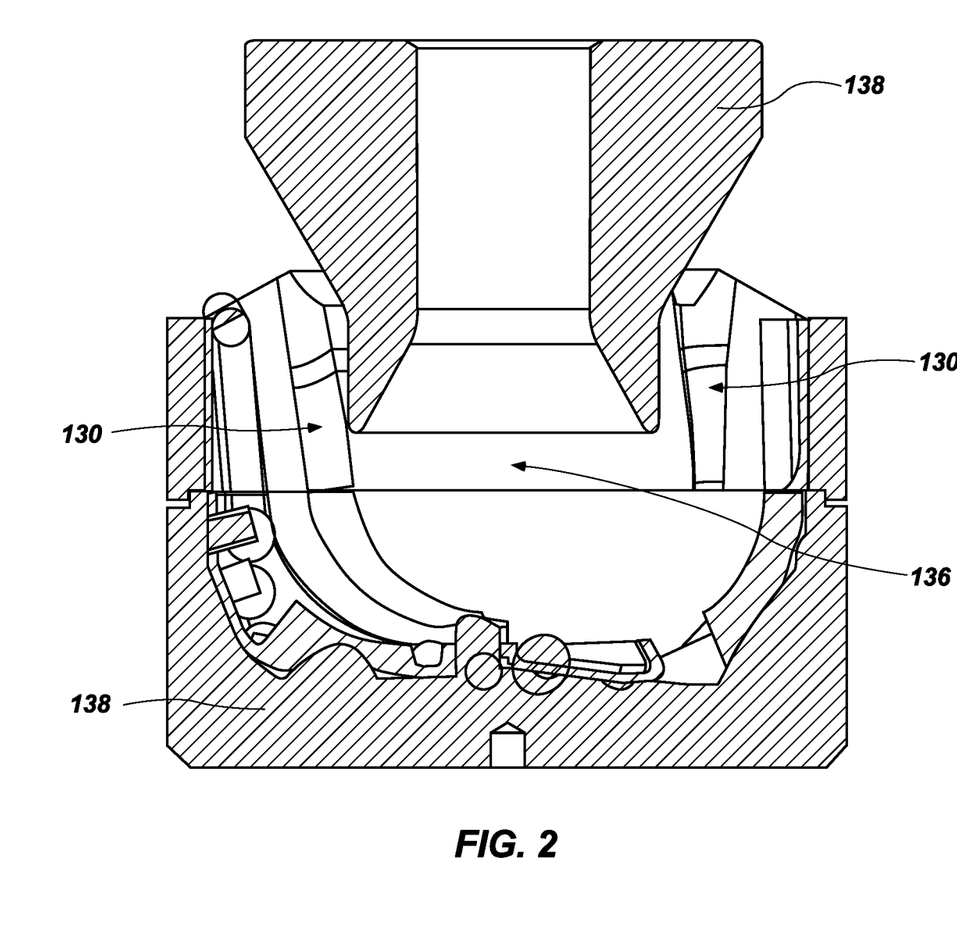
FIG. 2 is a cross-sectional side view illustrating inserts like those illustrated in FIG. 4 positioned in a mold cavity within a mold in preparation for casting a body of an earth-boring downhole tool therein.

FIG. 2 is a cross-sectional side view illustrating inserts 130 positioned in a mold cavity 136 within a mold 138 in preparation for casting the bit body 102 of FIG. 1 of an earth boring downhole tool therein. The mold 138 for the bit body 102 may be formed by milling a block of material such as graphite to define a mold cavity 136 with features corresponding with desired exterior features of a resulting bit body 102. The mold cavity 136 may be formed with recesses located and configured to define the plurality of blades 116 of the resulting bit body 102 of FIG. 1. Other various features of the resulting bit body 102, such as cutting element pockets 112, and/or internal fluid passageways may also be formed by shaping the mold cavity 136 and/or by positioning various temporary displacement materials within interior portions of the mold cavity 136.

The bit body 102 of FIG. 1 may be formed to have outer surfaces that are relatively more wear-resistant (relative to the interior bulk regions of the bit body 102) by separately forming inserts 130 as described below with reference to FIGS. 4-7, and then applying the inserts 130 to interior surfaces of the mold 138 within the mold cavity 136, as shown in FIG. 2, and then casting the bit body 102 within the mold cavity 136. The inserts 130 may be formed using an additive manufacturing process, as described below with reference to FIGS. 4-7.

At least a portion of the outer surfaces 134 of the inserts 130 may be configured to have a geometry conforming to a geometry of a portion of at least one interior surface of the mold 138 defining the mold cavity 136 within the mold 138. The inserts 130 may be positioned onto an interior surface of the mold cavity 136 such that at least a portion of the outer surface 134 of the insert 130 is adjacent to at least a portion of at least one interior surface of the mold cavity 136.

In some embodiments, the inserts 130 may comprise a bonding material on at least a portion of an outer surface 134 (FIG. 4) thereof. The bonding material may be used to secure the inserts 130 in place within the mold 138 during the casting process. In some embodiments, the bonding material may comprise a polymeric adhesive, such as epoxy. In some embodiments, such a bonding material may be applied to surfaces of the mold 138 within the mold cavity 136 in addition to, or in place of, applying a bonding material to the inserts 130.

In some embodiments, the inserts 130 may comprise a bonding material on at least a portion of an outer surface 134 (FIG. 4) thereof for the purpose of improving the bond strength between the inserts 130 and the remainder of the bit body 102 to be cast within the mold 138. In such embodiments, the bonding material may comprise a metal or metal alloy, such as nickel or a nickel-based alloy. For example, in some embodiments, the inserts 130 may be coated with nickel or a nickel-based alloy prior to placing the inserts 130 in the mold cavity 136.

Figure 3:
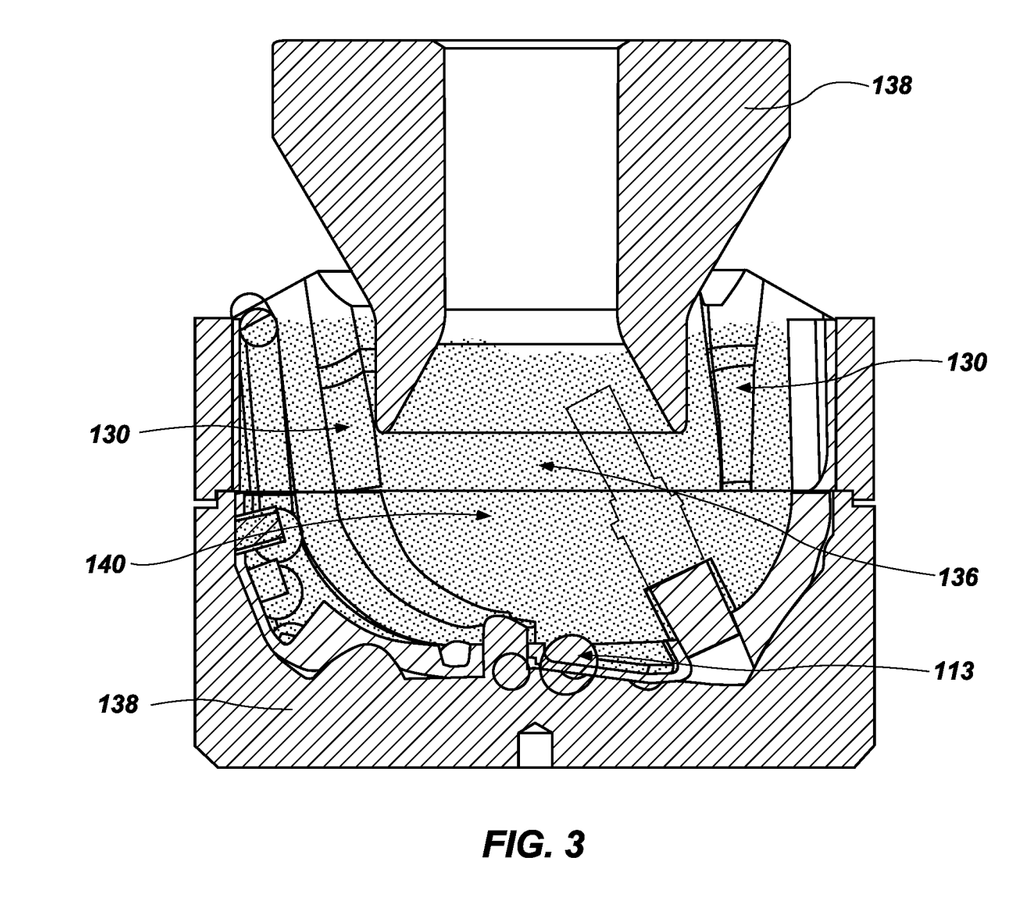
FIG. 3 is a cross-sectional side view like that of FIG. 2 illustrating particles of hard-phase material, inserts, and surfaces defining cutting element pockets within the mold cavity and adjacent the inserts in preparation for infiltrating the hard-phase particles and casting a body of an earth-boring downhole tool therein.

FIG. 3 is a cross-sectional side view like that of FIG. 2 illustrating hard-phase particles 140, inserts 130, and surfaces defining cutting element pockets 113 within the mold cavity 136 and adjacent the inserts 130 in preparation for infiltrating the hard-phase particles 140 and casting a body of an earth-boring downhole tool therein. After positioning the inserts 130 within the mold cavity 136, the bulk of the mold cavity 136 may be filled with the hard-phase particles 140. The hard-phase particles 140 then may be infiltrated with molten metal matrix material. After the infiltration process, the molten metal matrix material is cooled and solidified, so as to form the bit body 102 and to cause wear-resistant structures formed by the inserts 130 to be incorporated into outer surfaces of the resulting bit body 102 upon completion of the casting process.

FIGS. 4-7 illustrate a set of inserts 130 that may be used in such a casting process. The inserts 130 may be fabricated by an additive manufacturing process. As previously discussed, the inserts 130 may be configured to be positioned within the mold cavity 136 such that the inserts 130 will form an outer formation-engaging surface on the plurality of blades 116 of the bit body 102 of the fixed blade earth-boring rotary drill bit 100 of FIG. 1. In some embodiments, the inserts 130, also may be configured to form a rotationally leading and/or a rotationally trailing surface of the plurality of blades 116 of the bit body 102 of FIG. 1. In some embodiments, the inserts 130 may be configured to form surfaces within the junk slots 118 of the bit body 102.

The inserts 130 may have complex three-dimensional shapes defining openings or holes 132 that define locations where cutting elements 110, Nozzle inserts 114, gage wear plugs 122, wear knots 120, or other elements may be placed into the blades 116 of bit bodies 102 of FIG. 1. In some embodiments, the inserts 130 may be configured such that the thickness of the insert 130 varies along the length, width, and/or height of the insert 130. The thickness of the insert 130 may be configured to vary due to design, balance, or wear requirements of the bit body 102 of FIG. 1.

The inserts 130 comprise particles of hard-phase material held together by a fugitive binder material, which may comprise a polymer, for example. In some embodiments, the particles of hard-phase material may include −40/+635 ASTM (American Society for Testing and Materials) mesh particles. As used herein, the phrase "−40/+635 ASTM mesh particles" means particles that pass through an ASTM No. 40 mesh screen, but do not pass through an ASTM No. 635 mesh screen, as defined in ASTM specification E11-04, which is entitled Standard Specification for Wire Cloth and Sieves for Testing Purposes. In some embodiments, the particles of hard-phase material may include −100/+300 ASTM mesh particles. In some embodiments, the particles of hard-phase material may comprise one or more of diamond particles, cast tungsten carbide, sintered tungsten carbide, and macro-crystalline tungsten carbide. In some embodiments, the tungsten carbide comprises spherical particles and may include −100/+300 ASTM mesh particles.

In some embodiments, the particles of hard-phase material may have a multimodal grain size distribution. In some embodiments, there may be more than one hard-phase material used in the same insert 130. In some embodiments, the insert 130 may comprise a hard-phase material having a different composition and/or a different average particle size relative to the additional hard-phase particles provided within the mold cavity 136 of FIG. 3.

In some embodiments, the inserts 130 may comprise particles of a metal matrix material, in addition to the hard-phase particles and the fugitive binder. In some embodiments, the metal matrix material may comprise copper, iron, nickel, cobalt, or a metal alloy. In some embodiments, the inserts 130 may be made from hydrophobic materials to inhibit "bit balling" at the surface of the bit face 103 (FIG. 1) during drilling operations.

Figure 8:
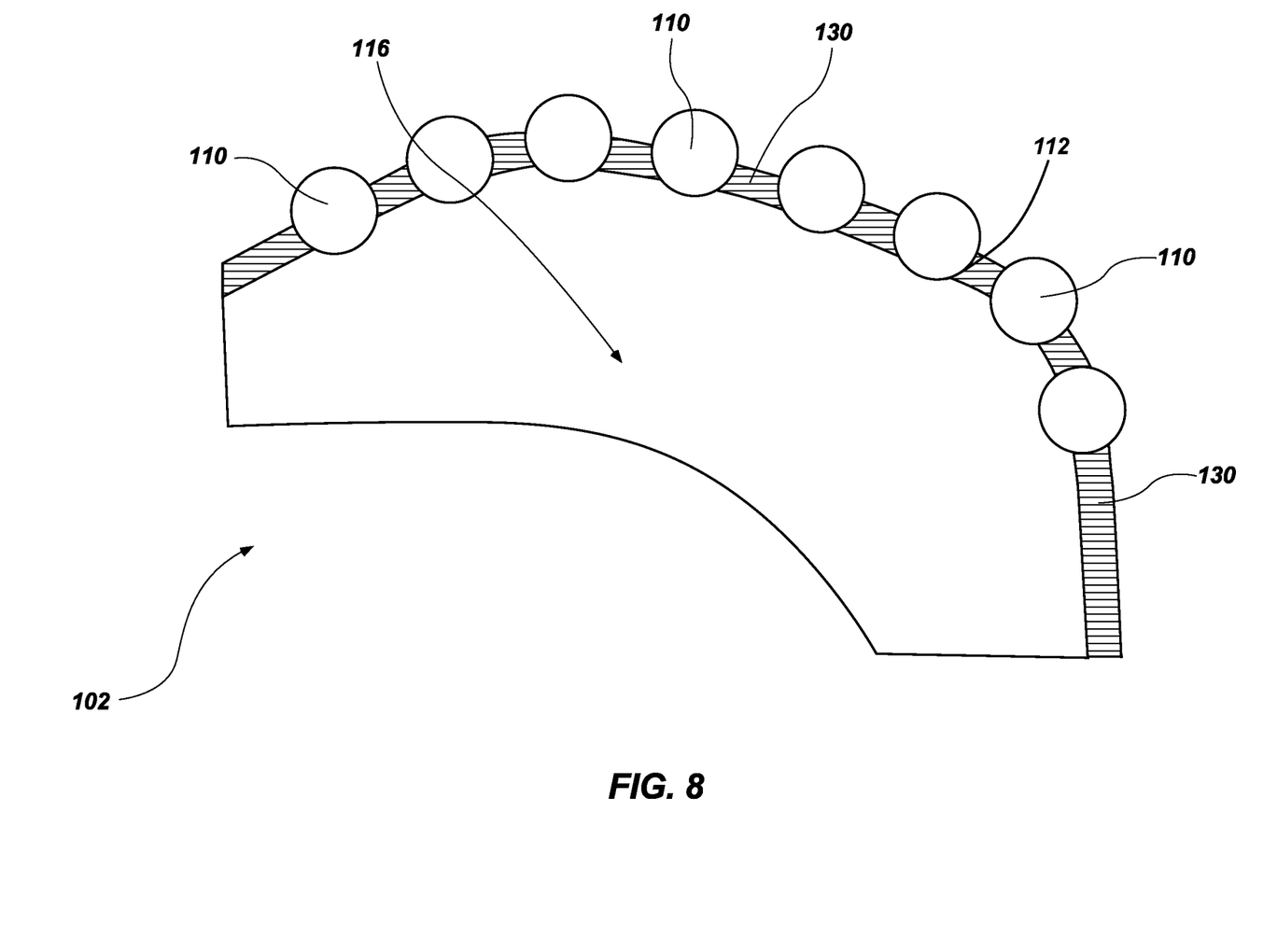
FIG. 8 is a partial cross-sectional side view of a blade of a body of an earth-boring downhole tool like that illustrated in FIG. 1, which has been fabricated in accordance with embodiments of the methods described herein, and illustrating an insert embedded in outer surfaces of the body.

In some embodiments, the inserts 130 may include surfaces that define cutting element pockets 113 such that, after the particle-matrix composite bit body is formed in the mold 138 (FIG. 3), cutting elements 110 may be secured within the cutting element pockets 112 in the hardfacing insert 130 on the surfaces of a blades 116, as illustrated in FIG. 8. In some embodiments, the inserts 130 may be configured with surfaces defining holes 132, cutouts or other shapes corresponding with desired exterior features of a resulting particle-matrix composite bit body.

The inserts 130 are formed using an additive manufacturing process. For example, the inserts 130 may be created using a three-dimensional (3D) printer using a jet binder powder layering process. In some embodiments, the binder used in the jet binder process may be an aqueous binder. In some embodiments the inserts 130 may be printed using a 3D printer incorporating a molten metal printing process. In such embodiments, the inserts 130 may not include a fugitive binder. If a fugitive binder is present, it will vaporize and/or burn off during the casting process, and metal matrix material will infiltrate the hard-phase particles to cement them in place on the exterior regions of the bit body.

Figure 4:
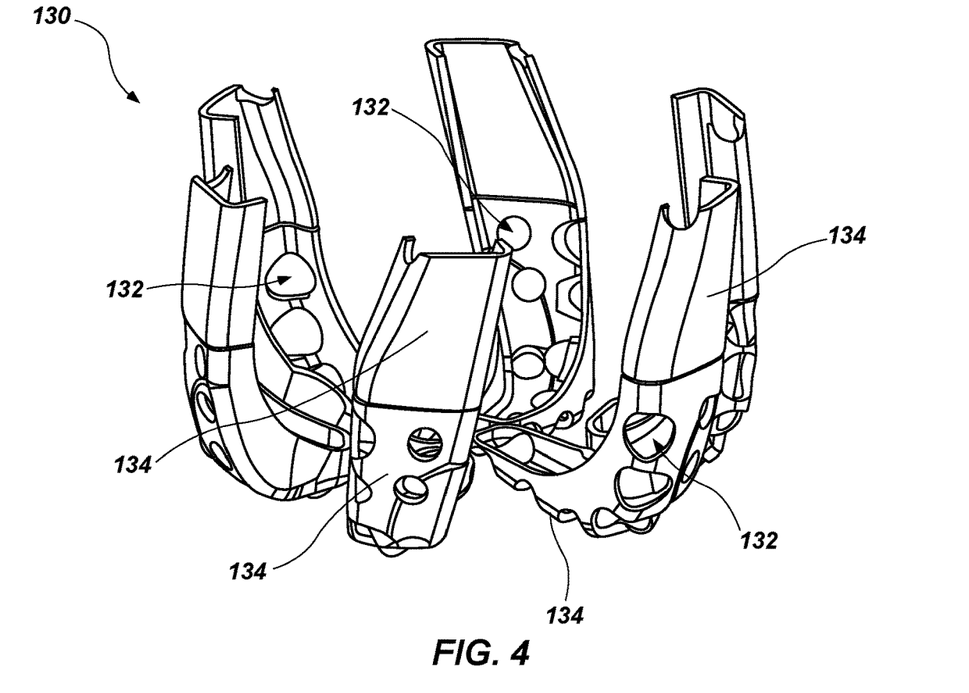
FIG. 4 is a perspective view of an embodiment of a plurality of inserts fabricated by an additive manufacturing process that may be incorporated into an earth-boring downhole tool like that illustrated in FIG. 1 during a casting process.

In some embodiments, the 3D printer (or other additive manufacturing device or system) may print the inserts 130 to have ridges, ribs, waveforms, bubbles, honeycombs, lattices, or other textures on a portion of an outer surface 134 of the inserts 130. Such features on the outer surfaces 134 of the inserts 130 may be used to aid in aligning the inserts 130 onto an interior surface of the mold cavity 136 to provide consistent repeatable alignment at tolerances from about 0.1-millimeters to about 5-millimeters. In some embodiments, the features or textures on the outer surfaces 134 of the inserts 130 may be used to improve adhesion and/or to provide mechanical locking properties of the inserts 130 onto interior surfaces of the mold 138 and/or the bulk of the bit body 102 (FIG. 1) to be cast over the inserts 130.

The resulting cast bit body 102 (FIG. 1) includes the inserts 130 configured to provide relatively more wear-resistant "cap" structures on outer surfaces of the bit body 102. In the embodiments illustrated in FIGS. 4-7, the inserts 130 are configured to provide "hardfacing" structures on the surfaces of the blades 116. Referring again to FIG. 1, in some embodiments, the inserts 130 may be positioned adjacent to and around cutting elements 110, nozzle inserts 114, gage wear plugs 122, and/or wear knots 120.

Figure 5:
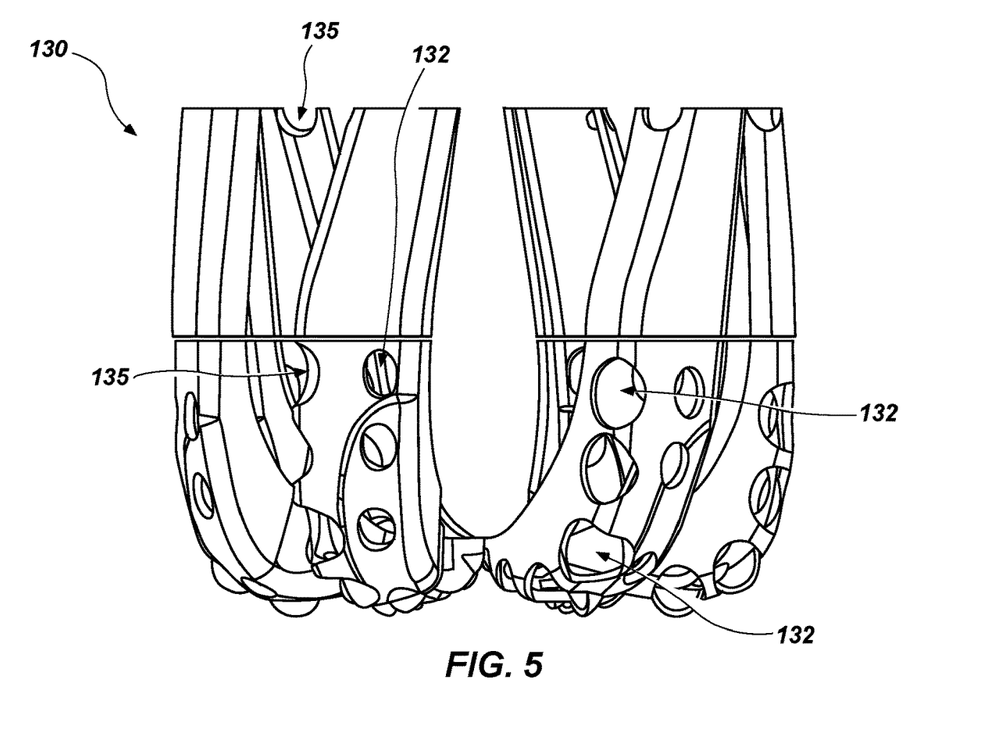
FIG. 5 is a side view of the plurality of inserts illustrated in FIG. 4.
Figure 6:
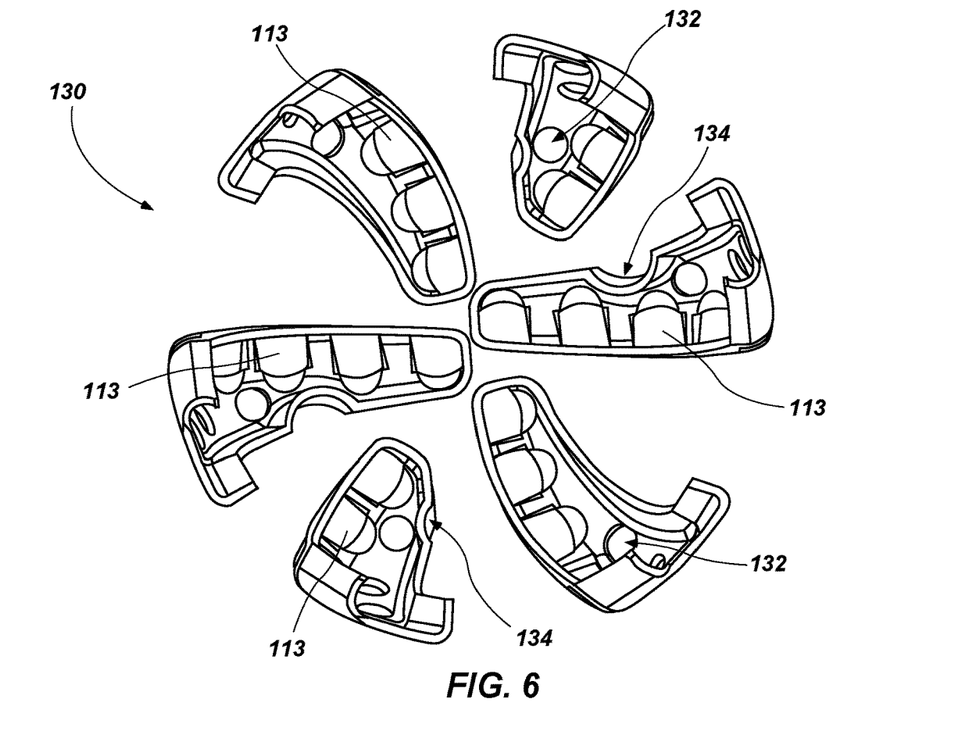
FIG. 6 is a bottom view of the plurality of inserts illustrated in FIGS. 4 and 5.
Figure 7:
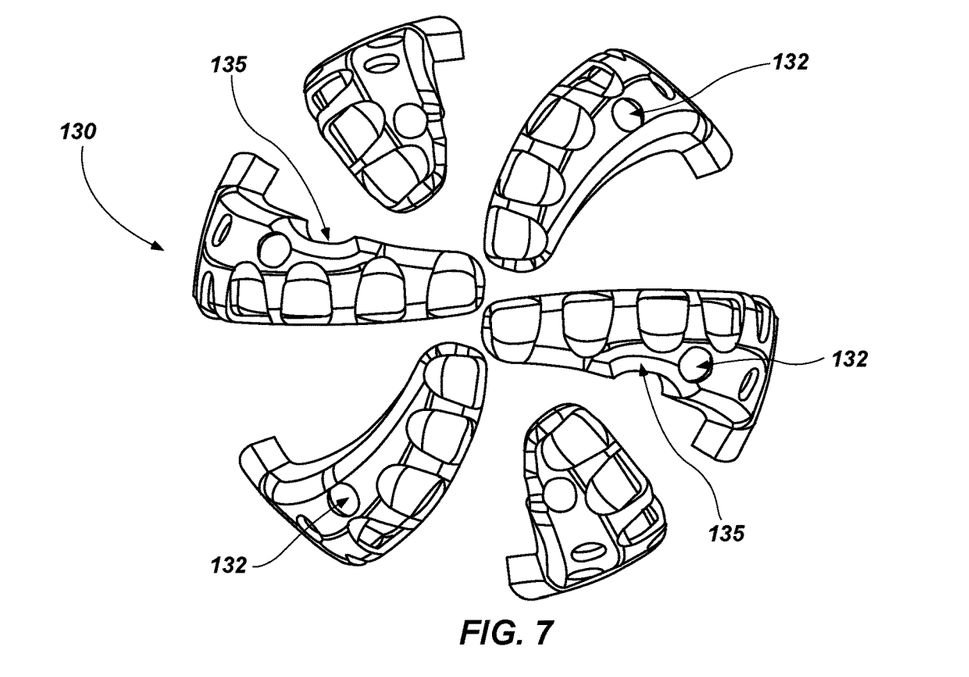
FIG. 7 is a top view of the plurality of inserts illustrated in FIGS. 4-6.

FIG. 8 is a partial cross-sectional side view of a blade 116 of a bit body 102 of an earth-boring downhole tool like that illustrated in FIG. 1, which has been fabricated in accordance with embodiments of the methods described herein. As shown in FIG. 8, the inserts 130 are embedded in outer surfaces of the bit body 102. In some embodiments, the inserts 130 may have surfaces defining holes 132 and cutouts 135 as illustrated in FIG. 5 to prevent the inserts 130 from obstructing features, such as cutting elements 110 on the bit body 102.

Additional non-limiting example embodiments of the disclosure are described below.

Embodiment 1: A method of forming a body of an earth-boring downhole tool, comprising: forming a mold having at least one interior surface defining a mold cavity within the mold, the mold cavity having a shape corresponding to a shape of the body of the earth-boring downhole tool to be formed therein. Forming at least one insert using an additive manufacturing process, the at least one insert comprising particles of hard-phase material and a binder material. Positioning the at least one insert within the mold cavity. Providing additional particles of hard-phase material within the mold cavity. Infiltrating the additional particles of hard-phase material with molten metal, and sintering and/or infiltrating the at least one insert to form the body of the earth-boring downhole tool, the body of the earth-boring downhole tool including the sintered and/or infiltrated at least one insert.

Embodiment 2: The method of Embodiment 1, wherein forming at least one insert using an additive manufacturing process comprises using a three-dimensional (3D) printer to print the at least one insert.

Embodiment 3: The method of Embodiment 1, further comprising providing fibers in the binder material of the at least one insert.

Embodiment 4: The method of Embodiment 1, further comprising forming the binder material to comprise an aqueous binder material.

Embodiment 5: The method of Embodiment 1, further comprising attaching the at least one insert within the mold cavity using an adhesive.

Embodiment 6: The method of Embodiment 1, further comprising selecting the particles of hard-phase material to comprise at least one of: particles of tungsten carbide, diamond particles, and particles of a hydrophobic ceramic.

Embodiment 7: The method of Embodiment 6, further comprising selecting the particles of hard-phase material to comprise spherical tungsten carbide particles.

Embodiment 8: The method of Embodiment 1, further comprising selecting the particles of hard-phase material to comprise a mixture of particles of a first hard-phase material and particles of a different second hard-phase material.

Embodiment 9: The method of Embodiment 1, further comprising selecting the particles of hard-phase material to have a multi-modal grain size distribution.

Embodiment 10: The method of Embodiment 1, further comprising selecting the particles of hard-phase material to have a mesh size of between 40 ASTM mesh and 635 ASTM mesh.

Embodiment 11: The method of Embodiment 10, further comprising selecting the particles of hard-phase material to have a mesh size of between 100 ASTM mesh and 325 ASTM mesh.

Embodiment 12: The method of Embodiment 1, further comprising forming the at least one insert to further comprise particles of metal matrix material.

Embodiment 13: The method of Embodiment 12, further comprising selecting the particles of metal matrix material to comprise a copper-based alloy.

Embodiment 14: The method of Embodiment 1, further comprising forming a non-planar interface between the at least one insert and a remainder of the body of the earth-boring downhole tool to provide increased bond strength between the at least one insert and the remainder of the body of the earth-boring downhole tool.

Embodiment 15: The method of Embodiment 1, further comprising forming a portion of an outer surface of the at least one insert to have a geometry conforming to a geometry of a portion of the at least one interior surface of the mold defining the mold cavity within the mold, and wherein positioning the at least one insert within the mold cavity comprises positioning the portion of an outer surface of the at least one insert adjacent the portion of the at least one interior surface of the mold.

Embodiment 16: The method of Embodiment 1, wherein the body of an earth-boring downhole tool comprises a bit body of an earth-boring rotary drill bit having longitudinally and radially extending blades, the mold cavity within the mold having recesses located and configured to define the blades of the bit body therein, and further comprising configuring the at least one insert to form an outer formation-engaging surface of at least one of the blades of the bit body.

Embodiment 17: The method of Embodiment 16, further comprising configuring the at least one insert to form a rotationally leading and/or a rotationally trailing surface of at least one of the blades of the bit body.

Embodiment 18: The method of Embodiment 1, further comprising providing a bonding material comprising nickel or a nickel-based alloy on at least a portion of an exterior surface of the at least one insert.

Embodiment 19: The method of Embodiment 1, further comprising selecting the particles of hard-phase material of the at least one insert to have a different composition and/or a different average particle size relative to additional particles of hard-phase material provided within the mold cavity.

Embodiment 20: The method of Embodiment 1, wherein, after formation of the body of the earth-boring downhole tool, the at least one insert exhibits dimensions within five-millimeters of the intended design dimensions for the at least one insert in the body of the earth-boring downhole tool.

By using an additive manufacturing process to form the inserts 130, and then positioning the inserts 130 within the mold cavity prior to the casting process, the dimensional tolerances of the resulting wear-resistant structures may be fabricated and precisely located to dimensional tolerances (from about 0.1-millimeters to about 5-millimeters) that are more precise than processes currently known in the art. Thus, embodiments of the disclosure may be particularly useful in providing a bit body of a drill bit or other earth-boring tool with improved wear characteristics, which may result in a longer service life. Extending the life of the earth-boring tool may result in significant cost savings for the operators of downhole earth-boring operations.

While the present invention has been described herein with respect to certain illustrated embodiments, those of ordinary skill in the art will recognize and appreciate that it is not so limited. Rather, many additions, deletions, and modifications to the illustrated embodiments may be made without departing from the scope of the invention as hereinafter claimed, including legal equivalents thereof. In addition, features from one embodiment may be combined with features of another embodiment while still being encompassed within the scope of the invention as contemplated by the inventors. Further, embodiments of the disclosure have utility with different and various types and configurations of earth-boring tools.

What is claimed is:
1. A method of forming a body of an earth-boring downhole tool, comprising:
additively manufacturing at least one blade insert comprising an insert body formed of particles of hard-phase material and a binder material, with:
a thickness varying along at least one dimension chosen from among a length, a width and a height; and
at least one opening formed in and extending through the insert body, the at least one opening sized for a portion of a respective PDC cutting element on a bit body of the earth-boring downhole tool to extend therethrough;
positioning the at least one blade insert within a mold cavity of a mold, the mold cavity defining a shape corresponding to the shape of the body of the earth-boring downhole tool to be formed therein with:
outer surfaces of the at least one blade insert arranged to form an outer surface and at least portions of rotationally leading and rotationally trailing surfaces of at least one blade of the body of the earth-boring downhole tool;
providing additional particles of hard-phase material within the mold cavity;
infiltrating the additional particles of hard-phase material with molten metal, and sintering and/or infiltrating the at least one blade insert to form the body of the earth-boring downhole tool comprising a corresponding cutting element pocket formed by the at least one opening of the at least one blade insert and the bit body; and securing the respective PDC cutting element to the bit body within the corresponding cutting element pocket.

2. The method of claim 1, wherein positioning at least one blade insert within a mold cavity of a mold comprises positioning a three-dimensionally (3D) printed at least one blade insert within the mold cavity.

3. The method of claim 1, further comprising selecting the at least one blade insert to include fibers in the binder material of the at least one blade insert.

4. The method of claim 1, further comprising selecting the at least one blade insert to include an aqueous binder material.

5. The method of claim 1, further comprising attaching the at least one blade insert within the mold cavity using an adhesive.

6. The method of claim 1, further comprising selecting the particles of hard-phase material to comprise at least one of: particles of tungsten carbide, diamond particles, and particles of a hydrophobic ceramic.

7. The method of claim 6, further comprising selecting the particles of hard-phase material to comprise spherical tungsten carbide particles.

8. The method of claim 1, further comprising selecting the particles of hard-phase material to comprise a mixture of particles of a first hard-phase material and particles of a different second hard-phase material.

9. The method of claim 1, further comprising selecting the particles of hard-phase material to have a multi-modal grain size distribution.

10. The method of claim 1, further comprising selecting the particles of hard-phase material to have a mesh size of between 40 ASTM mesh and 635 ASTM mesh.

11. The method of claim 1, further comprising forming the at least one blade insert to further comprise particles of metal matrix material.

12. The method of claim 11, further comprising selecting the particles of metal matrix material to comprise a copper-based alloy.

13. The method of claim 1, further comprising forming a non-planar interface between the at least one blade insert and the bit body of the earth-boring downhole tool to provide increased bond strength between the at least one blade insert and the bit body of the earth-boring downhole tool.

14. The method of claim 1, further comprising forming a portion of an outer surface of the at least one blade insert to have a geometry conforming to a geometry of a portion of at least one interior surface of the mold defining the mold cavity within the mold, and wherein positioning the at least one blade insert within the mold cavity comprises positioning the portion of the outer surface of the at least one blade insert adjacent the portion of the at least one interior surface of the mold.

15. The method of claim 1, further comprising providing a bonding material comprising nickel or a nickel-based alloy on at least a portion of an exterior surface of the at least one blade insert.

16. The method of claim 1, further comprising selecting the particles of hard-phase material of the at least one blade insert to have a different composition and/or a different average particle size relative to additional particles of hard-phase material provided within the mold cavity.

17. The method of claim 1, wherein, after formation of the body of the earth-boring downhole tool, the at least one blade insert exhibits dimensions within five-millimeters of intended design dimensions for the at least one blade insert in the body of the earth-boring downhole tool.

18. The method of claim 1, wherein positioning at least one blade insert comprises using one or more alignment features, selected from among ridges, ribs, waveforms, bubbles, honeycombs, and lattices, arranged on at least a portion of the at least one blade insert to align the at least one blade insert within the mold cavity.

19. The method of claim 1, further comprising selecting the at least one blade insert to comprise a hydrophobic material.

\* \* \* \* \*